US011140597B2

(12) United States Patent
Liu

(10) Patent No.: US 11,140,597 B2
(45) Date of Patent: Oct. 5, 2021

(54) METHOD AND APPARATUS FOR PROCESSING LINK ESTABLISHMENT FAILURE, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/756,328

(22) PCT Filed: Oct. 20, 2017

(86) PCT No.: PCT/CN2017/107116
§ 371 (c)(1),
(2) Date: Apr. 15, 2020

(87) PCT Pub. No.: WO2019/075751
PCT Pub. Date: Apr. 25, 2019

(65) Prior Publication Data
US 2020/0288366 A1    Sep. 10, 2020

(51) Int. Cl.
*H04W 36/12*    (2009.01)
*H04W 36/30*    (2009.01)
(Continued)

(52) U.S. Cl.
CPC ..... *H04W 36/125* (2018.08); *H04W 36/0007* (2018.08); *H04W 36/305* (2018.08); *H04W 56/001* (2013.01); *H04W 84/042* (2013.01)

(58) Field of Classification Search
None
See application file for complete search history.

(56) References Cited

U.S. PATENT DOCUMENTS 9,955,381 B2 *  4/2018  Koskinen ............. H04W 28/08
2015/0031363 A1 *  1/2015  Kordybach ..... H04W 36/00837
455/436

(Continued)

FOREIGN PATENT DOCUMENTS

CN    101754311 A    6/2010
CN    103929787 A    7/2014
(Continued)

OTHER PUBLICATIONS

3GPP TS 23.161 V14.0.0 (Mar. 2017); 3rd Generation Partnership Project; Technical Specification Group Services and System Aspects; Network-Based IP Flow Mobility (NBIFOM); Stage 2 (Release 14).
(Continued)

*Primary Examiner* — Kenny S Lin
(74) *Attorney, Agent, or Firm* — Young Basile Hanlon & MacFarlane, P.C.

(57) ABSTRACT

Disclosed in the present application are a method and apparatus for processing a link establishment failure, and a computer storage medium. The method comprises: a terminal receives a first instruction message sent by a network, the first instruction message being used for instructing the terminal to perform a service link switching operation; the terminal switches a source service link to a target service link according to the first instruction message; and if the target service link fails to be established, the terminal sends second instruction information to the network, the second information being used for instructing the establishment failure of the target service link to the network.

18 Claims, 6 Drawing Sheets

(51) Int. Cl.
      *H04W 56/00*    (2009.01)
      *H04W 36/00*    (2009.01)
      *H04W 84/04*    (2009.01)

(56) References Cited

U.S. PATENT DOCUMENTS

| | | |
|---|---|---|
| 2015/0341840 A1 | 11/2015 | Lee et al. |
| 2016/0135089 A1 | 5/2016 | Catovic et al. |
| 2016/0309386 A1* | 10/2016 | Nagasaka ......... H04W 36/0022 |
| 2017/0164221 A1 | 6/2017 | Tan Bergstrom et al. |

FOREIGN PATENT DOCUMENTS

| | | |
|---|---|---|
| CN | 105009628 A | 10/2015 |
| EP | 3306976 A1 | 4/2018 |
| WO | 2016190655 A1 | 12/2016 |

OTHER PUBLICATIONS

3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

Extended European Search Report for EP Application 17929414.5 dated Jul. 23, 2020.

Indian Examination Report for IN Application 202017019618 dated Apr. 30, 2021. (5 pages).

* cited by examiner

METHOD AND APPARATUS FOR PROCESSING LINK ESTABLISHMENT FAILURE, AND COMPUTER STORAGE MEDIUM

CROSS-REFERENCE TO RELATED APPLICATION(S)

This application is a 371 application of International Application No. PCT/CN2017/107116, filed on Oct. 20, 2017, the entire disclosure of which is hereby incorporated by reference.

TECHNICAL FIELD

The present application relates to the field of mobile communication technology, in particular to a method and a device for processing link establishment failure and a computer storage medium.

BACKGROUND

In a 5th generation mobile communication system, data transmission between a terminal and a network may be performed through multi-connectivity, for example, the data transmission is preformed through a 3rd Generation Partnership Project (3GPP) network or a non-3GPP network, or through different Radio Access Types (RATs) within the 3GPP system. Below is an example of data transmission performed simultaneously through the 3GPP network and the non-3GPP network.

Refer to FIG. 1 which is a first schematic diagram of architecture of multi-connectivity between a terminal and a network. Herein UE (User Equipment) represents a terminal, 3GPP Access represents a 3GPP access network, Untrusted Non-3GPP Access represents an untrusted non-3GPP access network, AMF (Access and Mobility Management Function) represents an access and mobility management function module, AUSF (Authentication Server Function) represents an authentication service function module, UDM (Unified Data Management) represents an unified data management module, SMF (Session Management Function) represents a session management function entity, PCF (Policy Control function) represents a policy control function module, AF (Application Function) represents an application function module, UPF (User plane Function) represents a user plane function module, and Data Network represents a data network.

Refer to FIG. 2 which is a second schematic diagram of architecture of multi-connectivity between a terminal and a network. Herein NextGen Core Network represents a 5G core network, ATSSS Function represents a service access management node, Policy Function represents a policy management node, UP Functions represent a user plane network device, WLAN represents a non-3GPP access system, and RAN represents a 3GPP access system.

As shown in FIG. 1 and FIG. 2, there is a service access network node at a network side, i.e., AMF or ATSSS Function, which is responsible for management of accesses through the 3GPP network or non-3GPP network.

Taking FIG. 2 as an example, the terminal or ATSSS may choose to split a service of the terminal when the terminal initiates the service or when the service is in progress, to simultaneously perform transmission in the 3GPP network and the non-3GPP network to improve a service throughput. However, when the terminal switches from a source link to a new link to perform service transmission, establishment of the new link may fail since the network does not know a state of the new link of the terminal.

SUMMARY

Implementations of the present application provide a method and device for processing link establishment failure, and a computer storage medium.

An implementation of the present application provides a method for processing link establishment failure. The method includes the following acts: a terminal receives a first indication message sent by a network, wherein the first indication message is used for indicating the terminal to perform a service link switching operation; the terminal switches from a source service link to a target service link based on the first indication message; and if establishment of the target service link fails, the terminal sends second indication information to the network, wherein the second indication information is used for indicating to the network the establishment failure of the target service link.

In an implementation of the present application, receiving, by the terminal, the first indication message sent by the network includes: the terminal receives the first indication message sent by the network, wherein the first indication message carries one or more types of the following information: network information of the target service link to be switched to; information about a service to be switched; terminal information of the terminal; user information of the terminal.

In an implementation of the present application, switching from the source service link to the target service link includes: the terminal discovers and resides in a target network corresponding to the target service link based on the network information in the first indication message; the terminal establishes a synchronization relationship with the target network; the terminal establishes a connection of the target service link with the target network; and the terminal determines the service to be switched based on the information about the service in the first indication message, and switches the service to be switched to the target service link.

In an implementation of the present application, before discovering and residing in the target network corresponding to the target service link, the method further includes: the terminal parses the first indication message to obtain all information in the first indication message; and the terminal determines that the terminal information in the first indication message matches with terminal information of the terminal itself.

In an implementation of the present application, the establishment failure of the target service link refers to failure in one or more the following operation processes: the terminal parses the first indication message to obtain all information in the first indication message; the terminal determines that the terminal information in the first indication message matches with the terminal information of the terminal itself; the terminal discovers and resides in the target network corresponding to the target service link based on the network information in the first indication message; the terminal establishes the synchronization relationship with the target network; the terminal establishes the connection of the target service link with the target network; the terminal determines the service to be switched based on the information about the service in the first indication message, and switching the service to be switched to the target service link.

In an implementation of the present application, the second indication information includes a message of the establishment failure of the target service link, wherein the message of the establishment failure of the target service link carries a failure cause, and the failure cause refers to identification information of a failed process.

In an implementation of the present application, the message of the establishment failure of the target service link further carries information about a network supported by the terminal, the information about the network supported by the terminal is used for indicating the network to perform the following operations: updating a target network for the terminal based on the information about the network supported by the terminal, and configuring the updated target network to the terminal.

In an implementation of the present application, if the failed process is: switching the service to be switched to the target service link, the second indication information further includes a response message, wherein the response message carries information about the service incapable of being switched to the target service link; and the method further includes that the terminal switches information about a service capable of being switched to the target service link to the target service link.

In an implementation of the present application, receiving, by the terminal, the first indication message sent by the network includes: the terminal receives dedicated signaling or broadcast signaling sent by the network, wherein the dedicated signaling or broadcast signaling carries the first indication message.

In an implementation of the present application, the network refers to a service network management module, which is located at least in an access network or a core network.

In an implementation of the present application, a type of the target service link supports different network communication systems; or, a type of the target service link supports different frequencies of terminals of a same network communication system; or, a type of the target service link supports different Public Land Mobile Network networks; a type of the target service link supports different core network entities or access network entities.

An implementation of the present application provides a device for processing link establishment failure, which includes a receiving unit, a switching unit and a sending unit.

The receiving unit is configured to receive a first indication message sent by a network, wherein the first indication message is used for indicating a terminal to perform a service link switching operation.

The switching unit is configured to switch from a source service link to a target service link based on the first indication message.

The sending unit is configured to send second indication information to the network if establishment of the target service link fails, wherein the second indication information is used for indicating to the network the establishment failure of the target service link.

In an implementation of the present application, the receiving unit is specifically configured to receive the first indication message sent by the network, wherein the first indication message carries one or more of types of the following information: network information of the target service link to be switched to; information about a service to be switched; terminal information of the terminal; user information of the terminal.

In an implementation of the present application, the switching unit includes a discovering and residing subunit, a network synchronization subunit, a network connection subunit and a service switching subunit.

The discovering and residing subunit is configured to discover and reside in a target network corresponding to the target service link based on the network information in the first indication message.

The network synchronization subunit is configured to establish a synchronization relationship with the target network.

The network connection subunit is configured to establish a connection of the target service link with the target network.

The service switching subunit is configured to determine the service to be switched based on the information about the service in the first indication message, and switch the service to be switched to the target service link.

In an implementation of the present application, the switching unit further includes a parsing subunit and a matching subunit.

The parsing subunit is configured to parse the first indication message to obtain all information in the first indication message.

The matching subunit is configured to determine that the terminal information in the first indication message matches with terminal information of the device itself.

In an implementation of the present application, the establishment failure of the target service link refers to failure in one or more of the following operation processes: the terminal parses the first indication message to obtain all information in the first indication message; the terminal determines that the terminal information in the first indication message matches with terminal information of the device itself; the terminal discovers and resides in the target network corresponding to the target service link based on the network information in the first indication message; the terminal establishes the synchronization relationship with the target network; the terminal establishes the connection of the target service link with the target network; the terminal determines the service to be switched based on the information about the service in the first indication message, and switches the service to be switched to the target service link.

In an implementation of the present application, the second indication information includes a message of the establishment failure of the target service link, wherein the message of the establishment failure of the target service link carries a failure cause, and the failure cause refers to identification information of a failed process.

In an implementation of the present application, the message of the establishment failure of the target service link further carries information about a network supported by the terminal, and the information about the network supported by the terminal is used for indicating the network to perform the following operations: updating a target network for the terminal based on the information about the network supported by the terminal, and configuring the updated target network to the terminal.

In an implementation of the present application, if the failed process is: switching the service to be switched to the target service link, the second indication information further includes a response message, wherein the response message carries information about the service incapable of being switched to the target service link; and the service switching subunit is further configured to switch information about a service capable of being switched to the target service link to the target service link.

In an implementation of the present application, the receiving unit is specifically configured to receive dedicated signaling or broadcast signaling sent by the network, wherein the dedicated signaling or broadcast signaling carries the first indication message.

In an implementation of the present application, a type of the target service link supports different network communication systems; or, a type of the target service link supports different frequencies of terminals of a same network communication system; or, a type of the target service link supports different PLMN networks; a type of the target service link supports different core network entities or access network entities.

An implementation of the present application provides a computer storage medium on which computer-executable instructions are stored, and when the computer-executable instructions are executed by a processor, the method for processing link establishment failure described above is implemented.

BRIEF DESCRIPTION OF DRAWINGS

Drawings described herein are used for providing a further understanding of the present application and form a part of the present application. Illustrative implementations of the present application and the descriptions thereof are used for explaining the present application and do not constitute improper limitations to the present application. In the drawings.

DETAILED DESCRIPTION

To understand features and technical contents of implementations of the present application in more details, implementations of the implementations of the present application will be described in detail below with reference to the drawings, which are only used for reference and description and are not used to limit the implementations of the present application.

Figure 1:
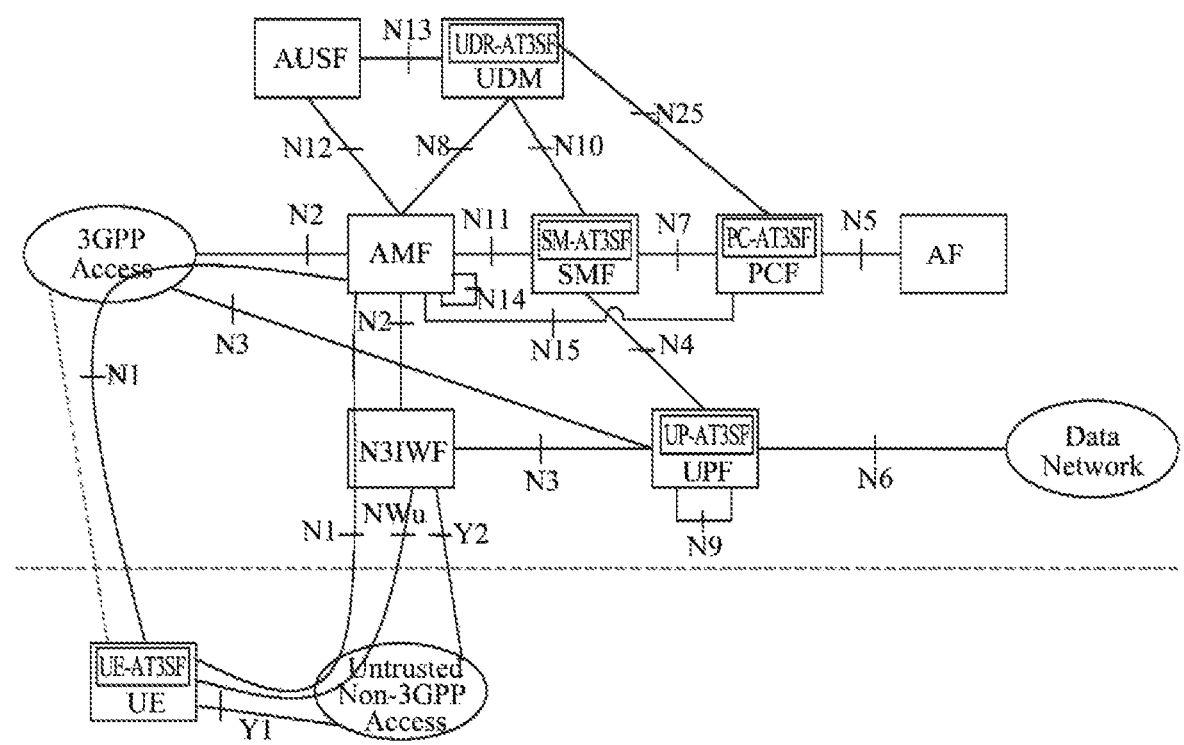
FIG. 1 is a first schematic diagram of architecture of multi-connectivity between a terminal and a network.
Figure 2:
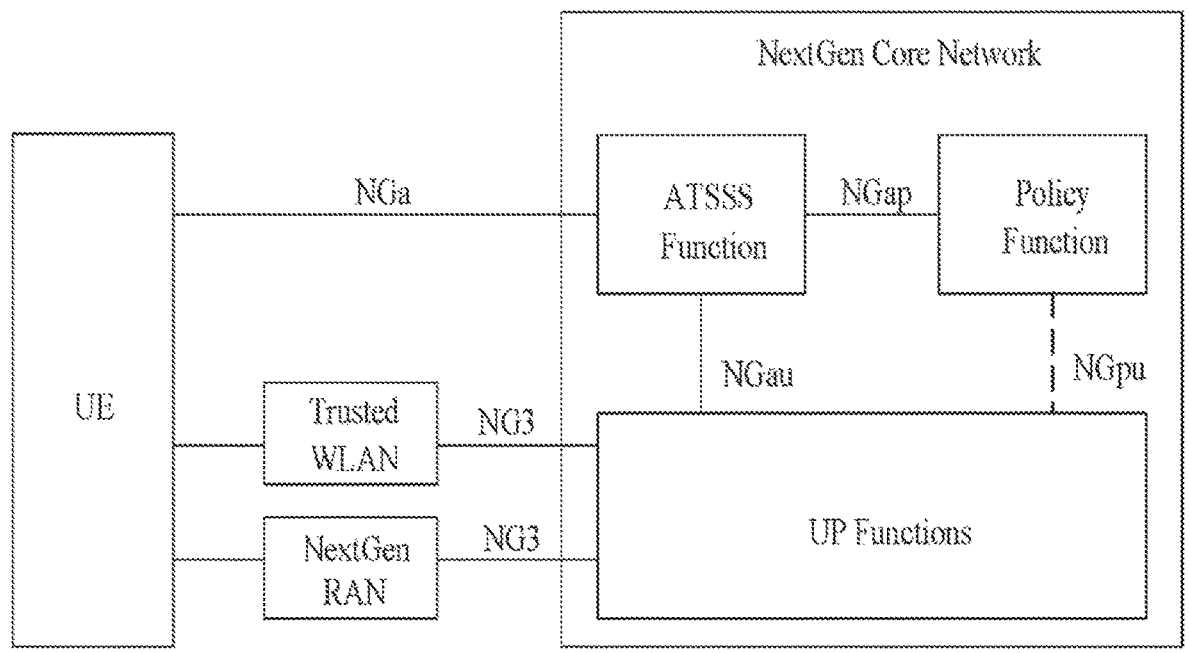
FIG. 2 is a second schematic diagram of architecture of multi-connectivity between a terminal and a network.
Figure 3:
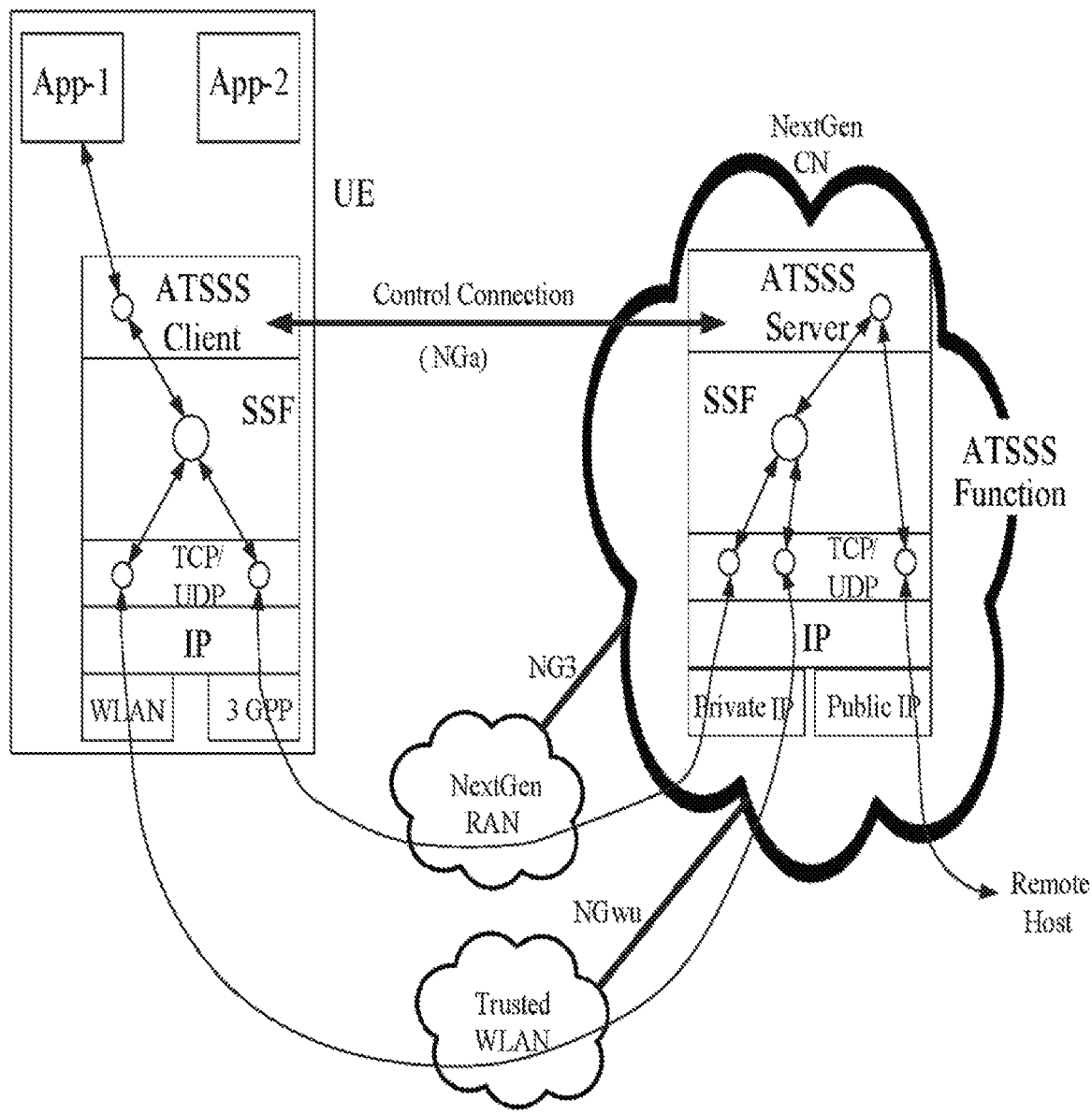
FIG. 3 is a schematic diagram of implementing simultaneous transmission of service data in a 3GPP network and a non-3GPP network in a data stack.

FIG. 3 is a schematic diagram of implementing simultaneous transmission of service data in a 3GPP network and a non-3GPP network in a data stack. As shown in FIG. 3, a left side of the FIG. 3 represents a UE, and a right side of the FIG. 3 represents an ATSSS Function in a NextGen Core Network.

For the UE, multiple applications may be installed in the UE, such as App-1 and App-2 in FIG. 3. Here, the applications may be any type of applications, such as a web page application, a chat application, a video application, etc. In addition, there are following functional entities in the UE: an ATSSS Client, a Service Split Function (SSF) entity, a Transmission Control Protocol (TCP)/User Datagram Protocol (UDP) entity, an Internet Protocol (IP) entity, a Wireless Local Area Network (WLAN) entity and a 3GPP entity. Herein, the WLAN entity is used for implementing a non-3GPP access function, and the 3GPP entity is used for implementing a 3GPP access function.

For the ATSSS Function, there are following functional entities in the ATSSS Function: an ATSSS server, an SSF entity, a TCP/UDP entity, an IP entity, a Private IP entity and a Public IP entity. Herein, the private IP entity is used for implementing non-3GPP interaction and 3GPP interaction with the UE, and the Public IP entity is used for implementing interaction with a Remote Host.

As shown in FIG. 3, a Control Connection is implemented between the ATSSS Client in the UE and the ATSSS Server in the ATSSS Function. For service data of a certain application, such as service data of App-1, the service data thereof first passes through the ATSSS Client. Since the Control Connection is implemented between the ATSSS Client and the ATSSS Server, the service data is delivered by the ATSSS Client to the SSF in the UE to be segmented into two paths of the service data. One path of the service data is transmitted to the WLAN entity after passing through the TCP/UDP entity and the IP entity, and the other path of the service data is transmitted to the 3GPP entity after passing through the TCP/UDP entity and the IP entity. Thereafter, the WLAN entity sends one path of the service data to the Private IP entity of the ATSSS Function through a WLAN access network, and the 3GPP entity sends the other path of the service data to the Private IP entity of the ATSSS Function through the NextGen RAN access network. Then, two paths of the service data are sent to the SSF entity through the IP entity and the TCP/UDP entity respectively, and the two paths of the service data are combined in the SSF entity and delivered to the ATSSS Server.

In a transmission process of the service data shown in FIG. 3, when the terminal switches from a source link to a new link to perform service transmission, the network does not know a state of the new link of the terminal, which may cause the network to be unaware of establishment failure of the new link. Therefore, an implementation of the present application provides a method for processing link establishment failure.

Figure 4:
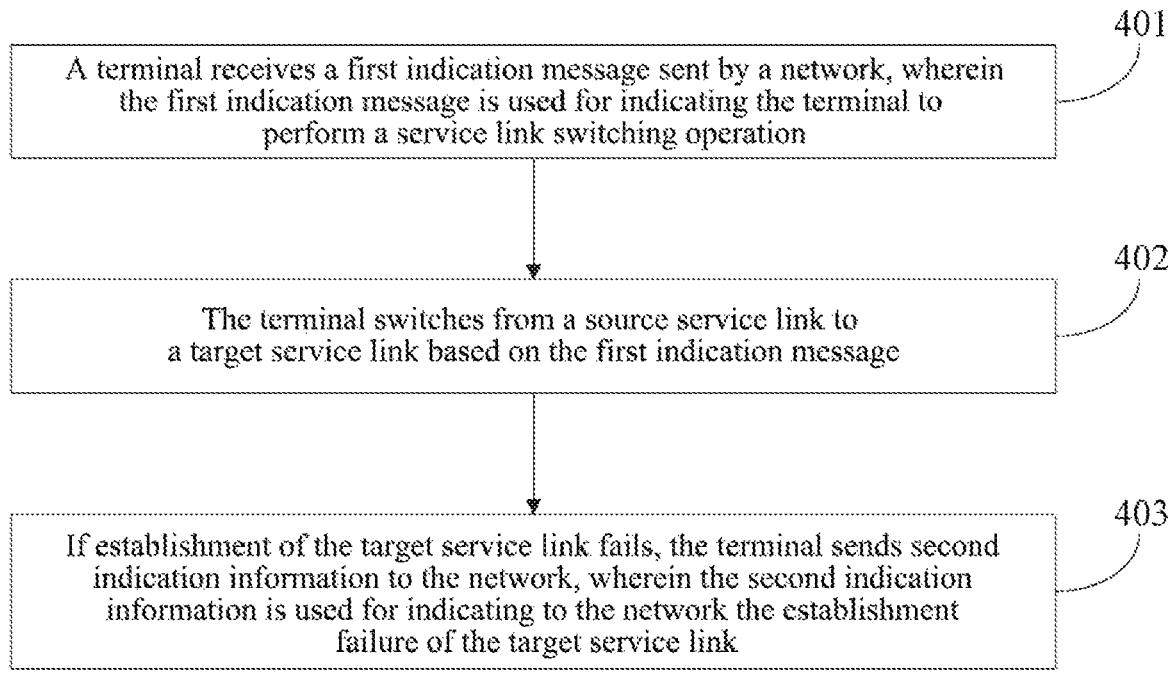
FIG. 4 is a schematic flowchart of a method for processing link establishment failure according to an implementation of the present application.

FIG. 4 is a schematic flowchart of a method for processing link establishment failure according to an implementation of the present application. As shown in FIG. 4, the method for processing link establishment failure includes the following acts 401 to 403.

In act 401, a terminal receives a first indication message sent by a network, wherein the first indication message is used for indicating the terminal to perform a service link switching operation.

In an implementation, the terminal receives dedicated signaling sent by the network, wherein the dedicated signaling carries the first indication message.

In another implementation, the terminal receives broadcast signaling sent by the network, wherein the broadcast signaling carries the first indication message.

In an implementation of the present application, the network refers to a service network management module, which may be located in an access network, a core network, or any other network.

In an implementation of the present application, the first indication message carries one or more types of the following information: network information of the target service link to be switched to; information about a service to be switched; terminal information of the terminal; user information of the terminal.

The information carried in the first indication message is explained below.

1) Network information of the target service link to be switched to is, for example, a type of a network system, and a network identifier of the target service link.

2) Information about a service to be switched is, for example, service type information, service flow information, bearer information, PDU session information, connection information of a Public Data Network (PDN), Quality of Service (QoS) flow information, service priority information, service grade information, etc.

3) Terminal information of the terminal is, for example, type information of the terminal (such as a low-cost terminal, an Enhanced Mobile Broadband (eMBB) terminal, a URLLC terminal), rank information of the terminal, priority information of the terminal, etc.

4) User information of the terminal is, for example, identification information of the user (e.g., a user of a specific location being identified by a specific value), priority information of the user (e.g., a VIP user, etc.), roaming information of the user (e.g., whether the user is a home PLMN (HPLMN) user or a visited PLMN (VPLMN) user), access rank information of the user, type information of the user, etc.

In act 402, the terminal switches from a source service link to a target service link based on the first indication message.

In an implementation of the present application, switching from the source service link to the target service link includes the following processes: the terminal discovers and resides in a target network corresponding to the target service link based on the network information in the first indication message; the terminal establishes a synchronization relationship with the target network; the terminal establishes a connection of the target service link with the target network; and the terminal determines the service to be switched based on the information about the service in the first indication message, and switches the service to be switched to the target service link.

Herein, before discovering and residing in the target network corresponding to the target service link, the method further includes the following processes: the terminal parses the first indication message to obtain all information in the first indication message; and the terminal determines that the terminal information in the first indication message matches with terminal information of the terminal itself.

In act 403, if establishment of the target service link fails, the terminal sends second indication information to the network, wherein the second indication information is used for indicating to the network the establishment failure of the target service link.

In an implementation of the present application, the establishment failure of the target service link refers to failure in one or more of the following operation processes: the terminal parses the first indication message to obtain all information in the first indication message; the terminal determines that the terminal information in the first indication message matches with the terminal information of the terminal itself; the terminal discovers and resides in the target network corresponding to the target service link based on the network information in the first indication message; the terminal establishes the synchronization relationship with the target network; the terminal establishes the connection of the target service link with the target network; the terminal determines the service to be switched based on the information about the service in the first indication message, and switches the service to be switched to the target service link.

In an implementation of the present application, the second indication information includes a message of the establishment failure of the target service link, wherein the message of the establishment failure of the target service link carries a failure cause, and the failure cause refers to identification information of a failed process.

For example, the failure cause may be: incapable of discovering or residing in a specified network, incapable of establishing synchronization with a specified network, incapable of establishing a connection with a specified network, incapable of parsing the first indication message, terminal information carried by the first indication message not matching with terminal information currently stored in the terminal, etc.

In a specific implementation, each process corresponds to a piece of identification information, so that the identification information of the failed process may be directly used as a failure cause and encapsulated into the message of the establishment failure of the target service link.

In an implementation, the message of the establishment failure of the target service link further carries information about a network supported by the terminal (e.g., information about a network that the terminal can discover or reside in, information about a network with which the terminal can establish synchronization or in which the synchronization already exists, information about a network with which the terminal can establish a connection or in which the connection already exists, etc.), and the information about the network supported by the terminal is used for indicating the network to perform the following operations: updating a target network for the terminal based on the information about the network supported by the terminal, and configuring the updated target network to the terminal.

In an implementation of the present application, if the failed process is: switching the service to be switched to the target service link, the second indication information further includes a response message, wherein the response message carries information about the service incapable of being switched to the target service link; the method further includes the terminal switches information about a service capable of being switched to the target service link to the target service link.

In an implementation of the present application, a type of the target service link supports different network communication systems, for example, a WLAN system, an EUTAN system, a 5G system; or, a type of the target service link supports different frequencies of terminals of a same network communication system; or, a type of the target service link supports different PLMN networks; a type of the target service link supports different core network entities or access network entities.

Figure 5:
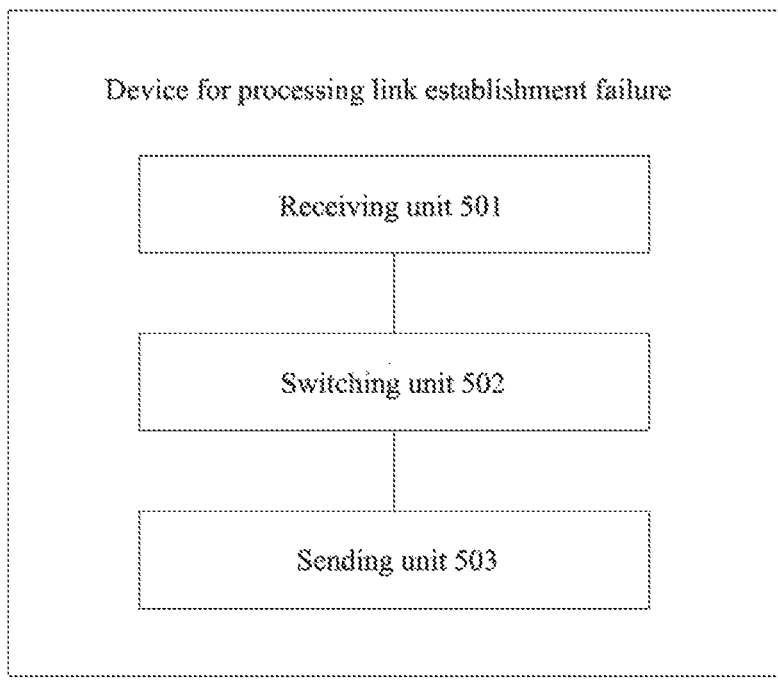
FIG. 5 is a schematic diagram of structure of a device for processing link establishment failure according to an implementation of the present application.

FIG. 5 is a schematic diagram of structure of a device for processing link establishment failure according to an implementation of the present application. As shown in FIG. 5, the device includes a receiving unit 501, a switching unit 502 and a sending unit 503.

The receiving unit 501 is configured to receive a first indication message sent by a network, wherein the first indication message is used for indicating a terminal to perform a service link switching operation.

The switching unit 502 is configured to switch from a source service link to a target service link based on the first indication message.

The sending unit 503 is configured to send second indication information to the network if establishment of the target service link fails, wherein the second indication information is used for indicating to the network the establishment failure of the target service link.

In an implementation, the receiving unit 501 is specifically configured to receive the first indication message sent by the network, wherein the first indication message carries one or more types of the following information: network information of the target service link to be switched to; information about a service to be switched; terminal information of the terminal; user information of the terminal.

Figure 6:
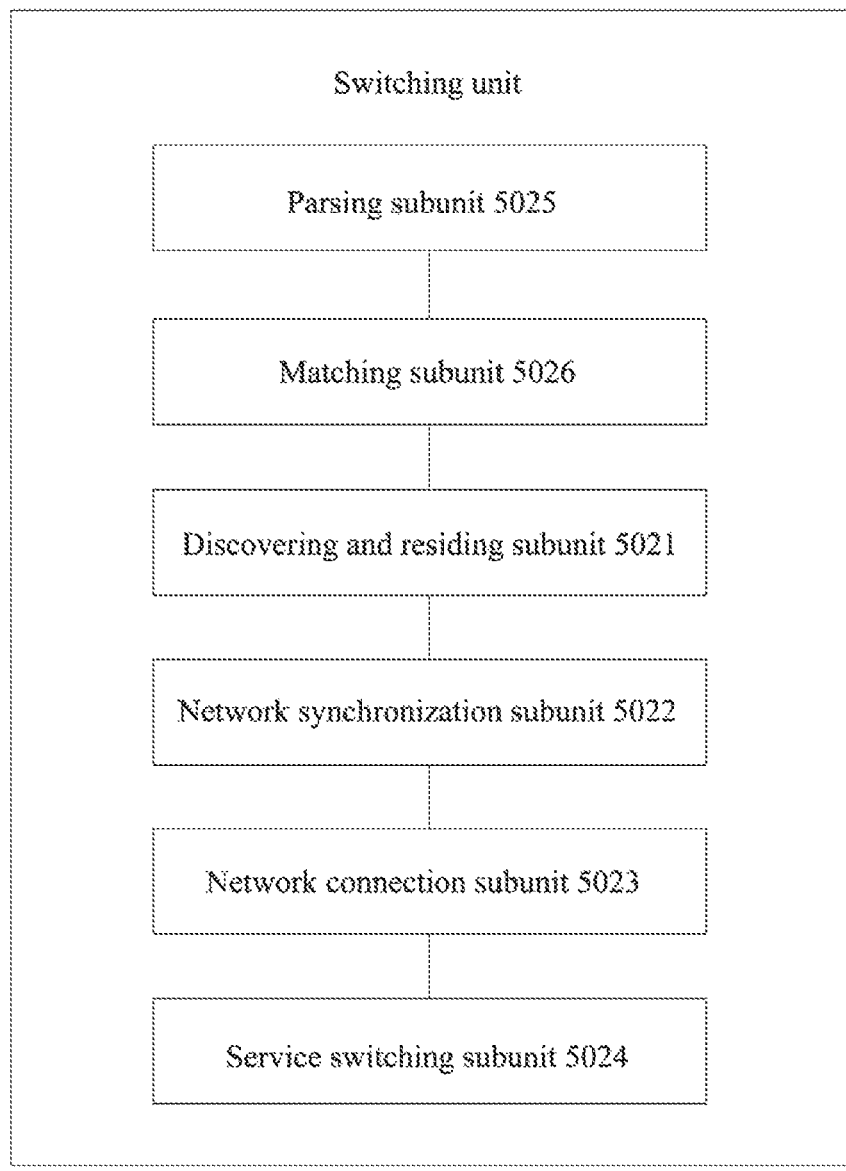
FIG. 6 is a schematic diagram of structure of a switching unit according to an implementation of the present application.

In an implementation, as shown in FIG. 6, the switching unit 502 includes a discovering and residing subunit 5021, a network synchronization subunit 5022, a network connection subunit 5023 and a service switching subunit 5024.

The discovering and residing subunit 5021 is configured to discover and reside in a target network corresponding to the target service link based on the network information in the first indication message.

The network synchronization subunit 5022 is configured to establish a synchronization relationship with the target network.

The network connection subunit 5023 is configured to establish a connection of the target service link with the target network.

The service switching subunit 5024 is configured to determine a service to be switched based on the information about the service in the first indication message and switch the service to be switched to the target service link.

In an implementation, as shown in FIG. 6, the switching unit 502 further includes a parsing subunit 5025 and a matching subunit 5026.

The parsing subunit 5025 is configured to parse the first indication message to obtain all information in the first indication message.

The matching subunit 5026 is configured to determine that the terminal information in the first indication message matches with terminal information of the terminal itself.

In an implementation, the establishment failure of the target service link refers to failure in one or more of the following operation processes: the terminal parses the first indication message to obtain all information in the first indication message; the terminal determines that the terminal information in the first indication message matches with terminal information of the terminal itself; the terminal discovers and resides in the target network corresponding to the target service link based on the network information in the first indication message; the terminal establishes a synchronization relationship with the target network; the terminal establishes a connection of the target service link with the target network; the terminal determines the service to be switched based on the information about the service in the first indication message, and switches the service to be switched to the target service link.

In an implementation, the second indication information includes a message of establishment failure of the target service link, wherein the message of the establishment failure of the target service link carries a failure cause, and the failure cause refers to identification information of a failed process.

In an implementation, the message of the establishment failure of the target service link further carries information about a network supported by the terminal, and the information about the network supported by the terminal is used for indicating the network to perform the following operations: updating a target network for the terminal based on the information about the network supported by the terminal, and configuring the updated target network to the terminal.

In an implementation, if the failed process is: switching the service to be switched to the target service link, the second indication information further includes a response message, wherein the response message carries information about the service incapable of being switched to the target service link; and the service switching subunit 5024 is further configured to switch information about a service capable of being switched to the target service link to the target service link.

In an implementation, the receiving unit 501 is specifically configured to receive dedicated signaling or broadcast signaling sent by the network, wherein the dedicated signaling or broadcast signaling carries the first indication message.

In an implementation, a type of the target service link supports different network communication systems; or, a type of the target service link supports different frequencies of terminals of a same network communication system; or, a type of the target service link supports different Public Land Mobile network (PLMN) networks; a type of the target service link supports different core network entities or access network entities.

Those skilled in the art should understand that the implementation function of each unit in the device for processing link establishment failure shown in FIG. 5 may be understood with reference to the corresponding description of the method for processing link establishment failure. The function of each unit in the device for processing link establishment failure shown in FIG. 5 may be implemented by a program running on the processor or by a specific logic circuit.

The above device for processing link establishment failure of the implementations of the present application may be stored in a computer readable storage medium when the device is implemented in a form of a software function module and sold or used as an independent product. Based on this understanding, the technical solutions of the implementations of the present application, in essence, or a part contributing to the prior art, may be embodied in a form of a software product stored in a storage medium. The software product includes several instructions for causing a computer device (which may be a personal computer, a server, or a network device, etc.) to perform all or part of the methods described in various implementations of the present application. The aforementioned storage medium includes a U disk, a mobile hard disk, a read-only memory (ROM), a magnetic disk or a compact disk, and other media capable of storing program codes. Thus, the implementations of the present application are not limited to any specific combination of hardware and software.

Correspondingly, an implementation of the present application further provides a computer storage medium, on which computer executable instructions are stored, and when the computer executable instructions are executed by a processor, the method for processing link establishment failure of the implementation of the present application is implemented.

Figure 7:
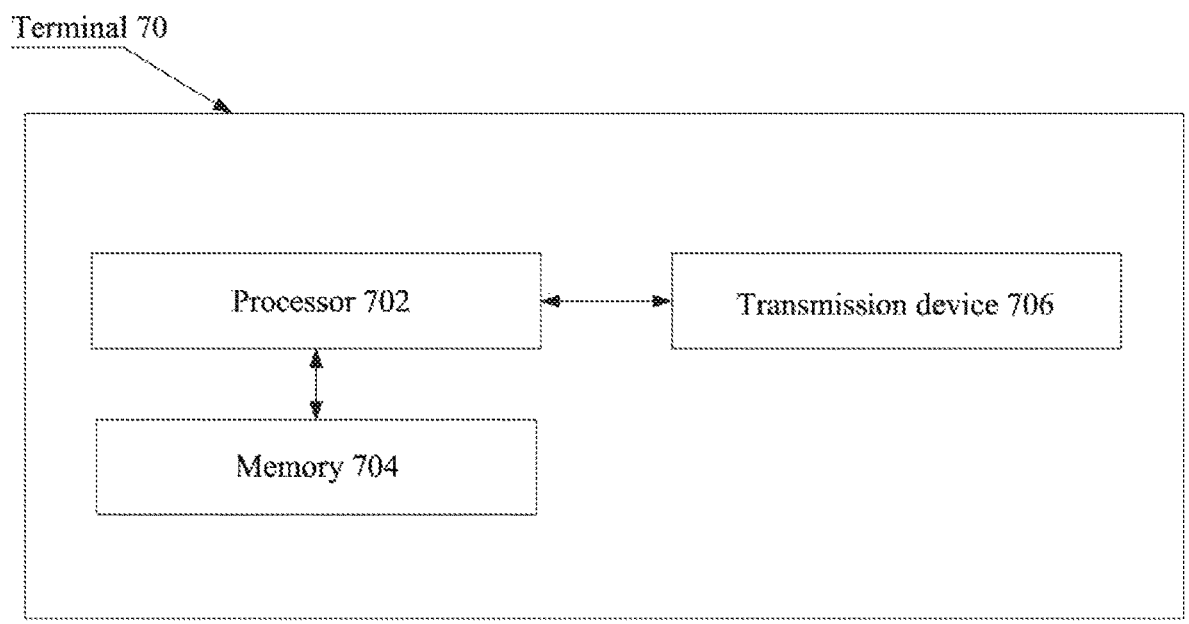
FIG. 7 is a schematic diagram of structure of a terminal according to an implementation of the present application.

FIG. 7 is a schematic diagram of structure of a terminal according to an implementation of the present application. As shown in FIG. 7, the terminal 70 may include one or more (only one is shown in the figure) processors 702 (the processor 702 may include, but is not limited to, processing devices such as a microprocessor (MCU), a programmable logic device (FPGA)), memories 704 for storing data, and transmission devices 706 for communication function. One of ordinary skill in the art can understand that the structure shown in FIG. 7 is only schematic and does not limit a structure of the above electronic device. For example, the terminal 70 may also include more or fewer components than those shown in FIG. 7, or have a different configuration from that shown in FIG. 7.

The memory 704 may be used for storing software programs and modules of application software, such as program instructions/modules corresponding to the method of processing link establishment failure in the implementation of the present application. The processor 702 performs various functional applications and data processing by executing the software programs and modules stored in the memory 704, i.e., implements the above method. The memory 704 may include a high-speed random access memory, or may include a non-volatile memory such as one or more magnetic storage devices, flash memories, or other non-volatile solid-state memories. In some examples, the memory 704 may further include memories remotely disposed with respect to the processor 702, which may be connected to the terminal 70 through a network. Examples of the above networks include, but are not limited to, the Internet, an intranet, a local area network, a mobile communication network, and combinations thereof.

The transmission device 706 is used for receiving or sending data via a network. A specific example of the network described above may include a wireless network provided by a communication provider of the terminal 70. In one example, the transmission device 706 includes a Network Interface Controller (NIC), which may be connected to other network devices through a base station to communicate with the Internet. In one example, the transmission device 706 may be a Radio Frequency module, which is used for communicating with the Internet in a wireless mode.

The technical solutions described in the implementations of the present application may be combined arbitrarily without conflicts.

In several implementations provided by the present application, it should be understood that the disclosed methods and intelligent devices may be implemented in other ways. The device implementations described above are only illustrative, for example, division of units is only a logical function division, and there may be other division modes in actual implementation, for example, multiple units or components may be combined or integrated into another system, or some features may be ignored or not executed. In addition, the mutual coupling or direct coupling or communication connection between various components shown or discussed may be indirect coupling or communication connection through some interface, device or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical requirements to achieve purposes of the implementations.

In addition, various functional units in various implementations of the present application may be integrated in a second processing unit, or various units may be physically present separately, or two or more units may be integrated in one unit. The above-mentioned integrated units may be implemented in a form of hardware or in a form of hardware plus software functional units.

What described above are merely implementations of the present application, but the protection scope of the present application is not limited thereto. Any person skilled in the art may easily conceive variations or substitutions within the technical scope disclosed by the present application, which should be included within the protection scope of the present application.

I claim:

1. A method for processing link establishment failure, comprising:
   receiving, by a terminal, a first indication message sent by a network, wherein the first indication message is used for indicating the terminal to perform a service link switching operation;
   switching, by the terminal, from a source service link to a target service link based on the first indication message; and
   based on a determination that establishment of the target service link fails, sending, by the terminal, second indication information to the network,
   wherein the second indication information is used for indicating to the network the establishment failure of the target service link
   wherein the second indication information comprises a message of the establishment failure of the target service link, the message of the establishment failure of the target service link further carries information about a network supported by the terminal, and the information about the network supported by the terminal is used for indicating the network to update a target network for the terminal based on the information about the network supported by the terminal and configure the updated target network to the terminal, and
   wherein the information about the network supported by the terminal comprises information about a network in which a synchronization or a connection already exists.

2. The method of claim 1, wherein receiving, by the terminal, the first indication message sent by the network, comprises:
   receiving, by the terminal, the first indication message sent by the network, wherein the first indication message carries one or more types of the following information:
   network information of the target service link to be switched to;
   information about a service to be switched;
   terminal information of the terminal; or
   user information of the terminal.

3. The method of claim 2, wherein switching from the source service link to the target service link comprises:
   discovering and residing in, by the terminal, a target network corresponding to the target service link based on the network information in the first indication message;
   establishing, by the terminal, a synchronization relationship with the target network;
   establishing, by the terminal, a connection of the target service link with the target network; and
   determining, by the terminal, the service to be switched based on the information about the service in the first indication message, and switching the service to be switched to the target service link.

4. The method of claim 3, wherein before discovering and residing in the target network corresponding to the target service link, the method further comprising:

parsing, by the terminal, the first indication message to obtain all information in the first indication message; and determining, by the terminal, that the terminal information in the first indication message matches with terminal information of the terminal.

5. The method of claim 4, wherein the establishment failure of the target service link refers to failure in one or more of the following operation processes:

parsing, by the terminal, the first indication message to obtain all information in the first indication message;

determining, by the terminal, that the terminal information in the first indication message matches with the terminal information of the terminal;

discovering and residing in, by the terminal, the target network corresponding to the target service link based on the network information in the first indication message;

establishing, by the terminal, the synchronization relationship with the target network;

establishing, by the terminal, the connection of the target service link with the target network; or determining, by the terminal, the service to be switched based on the information about the service in the first indication message, and switching the service to be switched to the target service link.

6. The method of claim 1, wherein the message of the establishment failure of the target service link carries a failure cause, and the failure cause refers to identification information of a failed process.

7. The method of claim 6, wherein based on a determination that the failed process is switching the service to be switched to the target service link, the second indication information further comprises a response message, wherein the response message carries information about the service incapable of being switched to the target service link; and the method further comprises: switching, by the terminal, information about a service capable of being switched to the target service link to the target service link.

8. The method of claim 1, wherein receiving, by the terminal, the first indication message sent by the network, comprises:

receiving, by the terminal, dedicated signaling or broadcast signaling sent by the network, wherein the dedicated signaling or broadcast signaling carries the first indication message.

9. The method of claim 1, wherein the network refers to a service network management module, and the service network management module is located at least in an access network or a core network.

10. A device for processing link establishment failure, comprising a processor and a communication device, wherein the communication device is configured to receive a first indication message sent by a network, wherein the first indication message is used for indicating a terminal to perform a service link switching operation;

the processor is configured to switch from a source service link to a target service link based on the first indication message;

the communication device is further configured to send second indication information to the network based on a determination that establishment of the target service link fails;

the second indication information is used for indicating to the network the establishment failure of the target service link, the second indication information comprises a message of the establishment failure of the target service link, the message of the establishment failure of the target service link further carries information about a network supported by the terminal, and the information about the network supported by the terminal is used for indicating the network to update a target network for the terminal based on the information about the network supported by the terminal and configure the updated target network to the terminal; and the information about the network supported by the terminal comprises information about a network in which a synchronization or a connection already exists.

11. The device of claim 10, wherein the communication device is configured to receive the first indication message sent by the network, wherein the first indication message carries one or more of types of the following information:

network information of the target service link to be switched to;

information about a service to be switched;

terminal information of the terminal; or user information of the terminal.

12. The device of claim 11, wherein the processor is configured to:

discover and reside in a target network corresponding to the target service link based on the network information in the first indication message;

establish a synchronization relationship with the target network;

establish a connection of the target service link with the target network; and determine the service to be switched based on the information about the service in the first indication message and switch the service to be switched to the target service link.

13. The device of claim 12, wherein the processor is further configured to:

parse the first indication message to obtain all information in the first indication message; and determine that the terminal information in the first indication message matches with terminal information of the terminal.

14. The device of claim 13, wherein the establishment failure of the target service link refers to failure in one or more of the following operation processes:

parsing the first indication message to obtain all information in the first indication message;

determining that the terminal information in the first indication message matches with terminal information of the terminal;

discovering and residing in the target network corresponding to the target service link based on the network information in the first indication message;

establishing the synchronization relationship with the target network;

establishing the connection of the target service link with the target network; or determining the service to be switched based on the information about the service in the first indication message, and switching the service to be switched to the target service link.

15. The device of claim 10, wherein the message of the establishment failure of the target service link carries a failure cause, and the failure cause refers to identification information of a failed process.

16. The device of claim 15, wherein based on a determination that the failed process is switching the service to be switched to the target service link, the second indication information further comprises a response message, wherein the response message carries information about the service incapable of being switched to the target service link; and the processor is further configured to switch information about a service capable of being switched to the target service link to the target service link.

17. The device of claim 10, wherein the communication device is configured to receive dedicated signaling or broadcast signaling sent by the network, wherein the dedicated signaling or broadcast signaling carries the first indication message.

18. The device of claim 10, wherein a type of the target service link supports different network communication systems; or, a type of the target service link supports different frequencies of terminals of a same network communication system; or, a type of the target service link supports different public land mobile network (PLMN) networks; or, a type of the target service link supports different core network entities or access network entities.

\* \* \* \* \*